(12) United States Patent
Davidson

(10) Patent No.: US 8,271,299 B2
(45) Date of Patent: Sep. 18, 2012

(54) RETURN-OF-PREMIUM INSURANCE SYSTEM AND METHOD

(76) Inventor: S. Kenneth Davidson, Inglewood, CA (US)

( * ) Notice: Subject to any disclaimer, the term of this patent is extended or adjusted under 35 U.S.C. 154(b) by 482 days.

(21) Appl. No.: 10/938,326

(22) Filed: Sep. 10, 2004

(65) Prior Publication Data
US 2006/0059020 A1 Mar. 16, 2006

(51) Int. Cl.
*G06Q 10/00* (2012.01)
(52) U.S. Cl. .......................................................... 705/4
(58) Field of Classification Search .................... 705/2–4
See application file for complete search history.

(56) References Cited

U.S. PATENT DOCUMENTS

| | | | |
|---|---|---|---|
| 6,044,352 A | 3/2000 | Deavers | |
| 7,027,992 B2 * | 4/2006 | Zaccaria et al. ................. | 705/4 |
| 2002/0077866 A1 | 6/2002 | Javerlhac | |
| 2002/0077868 A1 | 6/2002 | Javerlhac | |
| 2002/0103678 A1 | 8/2002 | Burkhalter et al. | |
| 2002/0165740 A1 | 11/2002 | Saunders | |
| 2003/0074231 A1 * | 4/2003 | Renes et al. ...................... | 705/4 |
| 2003/0126053 A1 * | 7/2003 | Boswell et al. ................. | 705/36 |
| 2003/0135396 A1 | 7/2003 | Javerlhac | |
| 2003/0236685 A1 * | 12/2003 | Buckner et al. .................. | 705/4 |
| 2004/0030625 A1 | 2/2004 | Rabson et al. | |
| 2005/0203822 A1 * | 9/2005 | Shea ............................... | 705/36 |

OTHER PUBLICATIONS

Richards, "Return of Premium Disability Insurance: The Black Hole," Jan. 6, 2002.*
Gandhi, "New policy combines term and permanent life," Jul. 28, 2004 (published on bankrate.com).*
"Shopping the Market for Finite Risk Products", Risk Management, p. 34, by Russ Banham, Sep. 1994, From Dialog File 16 (Gale Group); Document No. 03537642.*
www.fcfbank.com/insurance/termsdefinitions published on Dec. 24, 2002.*
http://www.chubb.com/international/singapore/cci/chubb5009.html.*
Morton L. Weinstein, publicily available at—http://www.ct.gov/ag/cwp/view.asp?A=1770&Q=281558, "Attorney General's Opinion"; Jun. 14, 1995.*

* cited by examiner

*Primary Examiner* — Vivek Koppikar
(74) *Attorney, Agent, or Firm* — J. Charles Dougherty

(57) ABSTRACT

An insurance method comprising a return-of-premium (ROP) benefit is disclosed. The ROP benefit is applied to property and casualty insurance and related insurance forms. The ROP benefit provides a return of all premiums after a set period of insurance, less the amount of any claims made by the insured. The policy may then be rolled over to again provide a ROP benefit to the policyholder. Fractional ROP benefit returns may be made on the policy after a minimum set period less than the full term of the policy. The ROP benefit may be provided by means of a rider to a standard property or casualty policy.

12 Claims, 2 Drawing Sheets

| Policy Year | 15-Year Policy Term | 20-Year Policy Term | 30-Year Policy Term |
|---|---|---|---|
| 1-5 | 0% | 0% | 0% |
| 6 | 5% | 3% | 1% |
| 7 | 10% | 6% | 2% |
| 8 | 15% | 9% | 3% |
| 9 | 20% | 12% | 4% |
| 10 | 25% | 15% | 5% |
| 11 | 40% | 22% | 7% |
| 12 | 55% | 29% | 9% |
| 13 | 70% | 36% | 11% |
| 14 | 85% | 43% | 13% |
| 15 | 100% | 50% | 15% |
| 16 | | 60% | 17% |
| 17 | | 70% | 19% |
| 18 | | 80% | 21% |
| 19 | | 90% | 23% |
| 20 | | 100% | 25% |
| 21 | | | 30% |
| 22 | | | 35% |
| 23 | | | 40% |
| 24 | | | 45% |
| 25 | | | 50% |
| 26 | | | 60% |
| 27 | | | 70% |
| 28 | | | 80% |
| 29 | | | 90% |
| 30 | | | 100% |

Fig. 1

RETURN-OF-PREMIUM INSURANCE SYSTEM AND METHOD

BACKGROUND OF THE INVENTION

The present invention relates to the insurance field, and in particular to a return-of-premium insurance system and method applicable to specific types of insurance.

Most of the standard insurance policies available today fall into one of two broad classes. The first class of insurance is usually referred to within the insurance field as "life and health," while the second class is referred to as "property and casualty." The life and health insurance field may include, but is not limited to, whole life insurance, term life insurance, fixed- and variable-rate annuities, guaranteed interest policies, equity indexed annuities, funeral insurance, credit life and disability, individual and group health, disability income, long-term care, medical supplements, supplemental benefits, and health maintenance organizations (HMOs). The property and casualty insurance field may include, but is not limited to, homeowners insurance, renters insurance, automotive insurance, directors and officers insurance, and professional malpractice insurance. These two classes of insurance are distinct from each other in many ways, and, recognizing these distinctions, most states require separate licenses for insurance agents working in these fields. Many states also dedicate separate divisions within their insurance regulatory departments to regulate these two different classes of insurance. Although a single agent can receive licenses in both fields, it is more common for an agent to specialize in one field or the other, due to the significant differences between the knowledge and skills necessary to provide agent services in these distinct fields.

One way to distinguish between these types of insurance is to recognize that life and health insurance is generally an optional form of insurance, but property and casualty insurance may often be considered required for the policyholder. By optional it is meant that the decision to purchase this type of insurance, as well as the details concerning the policy, are within the discretion of the policyholder, and such policies are sometimes required by a third party, for example, to fund a buy-and-sell agreement or key-man insurance. The policyholder purchases life and health insurance voluntarily, based on a personal decision about a perceived need. By contrast, a person may often be required to purchase various forms of property and casualty insurance, and the policy particulars, or at least the policy coverage minimums, may be set forth as required parameters. For example, automobile liability insurance is generally required by state law, which sets forth certain minimum requirements that the policy must contain by all automobile owners and licensed drivers. While the policyholder is free to choose more comprehensive coverage than the minimums mandated by law, he or she must purchase coverage that at least meets the minimum requirements. Likewise, homeowners insurance is typically required by lenders for a party that is seeking a mortgage in order to purchase a home. In this case as well, the lender will generally provide minimum requirements for the homeowners insurance that must be purchased by the mortgagor, although the homeowner may, if desired, exceed those minimum requirements, or terminate the coverage once the loan is repaid and the mortgage released.

The return-of-premium (ROP) concept has been applied by a few insurance providers within the field of life and health (that is, optional) insurance. Typically, the insured is given the option of purchasing a rider to a traditional insurance policy, with the rider including the ROP benefits. By purchasing the ROP rider, the customer is guaranteed the return of all insurance premiums paid provided that the policy is maintained for a set period, less the amount of any claims made during that period. While the overall amount of each premium payment is higher, the insured party may be encouraged to purchase optional insurance when the opportunity of a full return of all premiums paid is presented.

By way of example, the ROP rider on term life insurance may be seen as highly advantageous by the term life customer. Term life insurance typically has no cash value, and thus at the end of the term the customer receives no value in return whatsoever. The only way that a customer receives any return on his or her insurance premiums is if he or she dies during the insurance term. Whole life insurance, which in contrast to term life insurance does offer an investment component, is often disfavored by life insurance purchasers as too costly and complex. The ROP concept allows life insurance to be priced more like term insurance, but also offer a savings-like component similar to whole life insurance. One may consider, for example, a healthy 40-year-old man who wants a $500,000 death benefit. A simple term life insurance policy with a 30-year term might cost $900 per year, while the ROP rider on such a policy might increase the cost by an additional $350 per year. But this is far less than the cost of a whole life policy in this amount, which might cost around $3300 per year. If the insured lives until the end of the 30-year term, he or she would receive a refund of $37,500. To receive that high of a return by investing in stocks, bonds, or similar after-tax investments over the same 30-year period, the insured would need to ensure an average rate of return of about 8%. The potential advantages of the ROP rider for term life insurance policies are thus clear.

While the ROP concept has been successfully applied in the area of "optional" insurance, that is, life and health insurance, the inventors are not aware of any application of this concept within the field of property and casualty, that is, "required" insurance. One of the critical differences between these forms of insurance is that while the terms of a required insurance policy may (and typically do) change over the life of the policy, the terms of life insurance and similar policies do not change over the policy's lifetime. One of the primary reasons for purchasing a life insurance policy at an early date is to secure a set premium and benefit over a period of years. Any possibility for change in the premium or benefits would be seen as highly disadvantageous by the insured. By contrast, property and casualty policies often change their benefits, premiums, and even whether the insured will be retained under the policy, based on changing conditions of the insured. For example, the cost of automobile collision insurance is based partly on the value of the automobile, which will change when a vehicle is sold and replaced with a newer vehicle. The cost of automobile liability insurance is based at least in part upon the past accident history of the insured, and thus a series of accidents within a period of time may cause the cost of the insurance to rise significantly.

Since property and casualty policies may change in a much more fluid fashion than, for example, life insurance policies, application of the ROP concept to these policies presents challenges not faced in the field of life insurance. Specifically, applying the flat-rate rider fee for ROP riders from term life policies directly onto property or casualty insurance is not feasible because the variability of these policies may result in a policyholder paying either far too much or too little for the ROP benefit. The insured could not be guaranteed a return of his or her fixed premiums; the return would instead be a variable amount, and thus the benefit would appear more like a traditional financial investment in a fluid market.

Another problem faced in any attempt to apply the ROP concept in the field of property and casualty insurance is that, unlike term life policies, property and casualty insurance typically has a variable premium for a policy where there may never be a claim. The policyholder holds such policies for an indefinite time. For example, a policyholder may likely hold homeowners insurance until the policyholder's house is sold, and may hold automobile liability insurance until the policyholder buys or sells his or her automobiles. The date on which these events will occur generally cannot be predicted in advance, while a life policy has a definite claim event, i.e., the death of the insured. As a result, the simple expiration of the property and casualty policy cannot be used as the gauge of when a ROP benefit will be paid out if the ROP concept is to be applied to property and casualty insurance.

While traditional ROP concepts cannot be directly applied to insurance in the property and casualty field, the potential benefits of developing an ROP method for required insurance are significant. First, the insurer may benefit from an ROP rider for required insurance because it would encourage policy longevity and stability. The competition among casualty and property insurance providers has become increasingly fierce in recent years, and one result of this competition has been an increase in the ease with which policyholders may switch from one insurer to another. In addition, policyholders now have access to an unprecedented amount of information that they may use to compare the premiums of various insurance providers. As a result of these factors, policyholders are more likely now to switch insurance providers in response to even tiny premium increases or slight differences in premiums charged by competing companies. Frequent switching of insurers is very costly to the insurance providers, who must expend significant sums to process the policies of new insureds and close the files of those who switch to another provider. By instituting a ROP option for such insurance, the insurer would be providing an incentive to its policyholders to remain with the insurer even if a less expensive policy alternative may be available, since if the insurer switches insurance providers he or she could not take advantage of the end-of-term ROP benefit. Thus the cost of providing the insurance would fall overall as the insurer lowers its overhead costs associated with policyholder mobility. The cost savings of an ROP benefit could be collected by the insurer, passed on to the policyholder in order to offer more competitive rates, or split in such a manner that both the insurer and policyholder reap a cost savings.

Another potential benefit of applying the ROP concept to "required" forms of insurance is that the ROP benefit will serve as an incentive to the policyholder to limit the frequency and severity of claims. Under traditional casualty insurance, the policyholder has little if any incentive to reduce the size of a claim once the claim exceeds the policyholder's deductible. Consider for example an automobile damage claim in which some simple bodywork could be applied to repair an automobile at a cost of $1000, but complete replacement of damaged body parts would result in a repair cost of $3000. If the policyholder's deductible is $500, then the policyholder experiences the same cost regardless of which repair is chosen. The policyholder will thus likely insist on the full-replacement repair. If, however, the policyholder held a ROP rider, and thus knew that the amount of his or her claim might impact his or her ROP benefit at the end of the policy term, then the policyholder may be encouraged to authorize the less costly repair option, particularly for an older vehicle. As a result, the cost of claims may be again reduced by widespread application of ROP benefits in casualty insurance, and thus the cost of providing the insurance may decrease. Again, the insurer may collect the cost savings as additional profit, pass on these savings to the customer in an effort to offer more competitive premium rates, or split the cost savings as both profit and reduced premiums to policyholders.

In addition to the potential benefits to the insurer as explained above, which may be passed to the insured in the form of reduced premiums, an ROP benefit would also offer significant advantages to the insured. One study indicates that the odds of a particular insured having an automobile accident that results in damage greater than the value of the insured automobile is only 1 in 246. Likewise, the odds of a total loss event for a home under a homeowners insurance policy are only 1 in 1200. Yet millions of people pay insurance premiums for policies from which they will never in their lifetimes receive any payment or benefit, simply because they are required to hold these forms of insurance either by law or as a result of a lender agreement. By adding an ROP benefit to the insurance policy, the policyholder turns these odds in his or her favor, since the policyholder will most likely receive a full return of the premiums he or she has paid for the insurance. Under current tax laws in the United States, it is believed by the inventor that this return will be tax-free, and thus the ROP benefit should compare well against other low-risk investment opportunities that are approached with after-tax funds.

One attempts to achieve some of these benefits with respect to property and casualty insurance is disclosed in United States Patent Application Publication Nos. 2003/0135396, 2002/0077866, and 2002/0077868, each to Javerlhac. In the Javerlhac method, the policyholder is charged an initial sum set to an amount in excess of the cost of insurance. This excess is invested by the insurer to earn income, with reimbursement of a portion of the sum made after a period less the amount of claims during that period. In one version of this method, the return to the policyholder is made at a guaranteed minimum rate. In another aspect of the invention, the insurer may return the entire initial sum along with earned income if the policyholder has made no claims. In this way, this method may encourage the policyholder to limit or forego claims against the insurer. In still another version, a fraction of the earnings from the over-cost payment is used to pay a portion of the policyholder's premiums.

The Javerlhac method does not offer all of the benefits of a ROP benefit applied to required forms of insurance. Few policyholders would have available the significant up-front cash sum required in order to take advantage of the Javerlhac method. The Javerlhac method is, in essence, an investment coupled with an up-front insurance premium payment. The policyholder could achieve many, if not all, of the same benefits by simply purchasing standard property or casualty insurance, investing the difference in a relatively secure financial instrument, and paying all or part of the insurance premiums as they come due with the proceeds. By contrast, a ROP benefit does not offer the policyholder any return other than that of the face amount of premiums paid in. Those premiums are paid over the life of the policy, and the cost associated with the ROP rider are paid at the time of each premium payment. Thus the cost of the ROP benefit is held in check by the limited nature of the benefit. The ROP structure, however, may offer tax advantages under United States tax laws that are not available using the Javerlhac method.

What is desired then is a insurance method applicable to property and casualty insurance and related insurance forms that may incorporate a ROP benefit for the policyholder in a desirable insurance product. This desire is achieved by the present invention as explained below.

BRIEF SUMMARY OF THE INVENTION

The present invention is directed to an insurance system and method for application in the fields of property and casualty insurance and related insurance that provides a ROP benefit to the insured. The insured may receive the ROP benefit through a rider on a traditional insurance policy. This rider will guarantee the return of the premium paid at the end of an agreed number of years, less the amount of any claims paid.

Because this class of insurance often require changes to policies over time, and because premiums may rise or fall over time, the cost of the ROP benefit in the present invention varies over time as well, being tied to the amount of the underlying insurance premium. This variable ROP benefit cost thus overcomes the limitation of life-insurance ROP approaches that use a static ROP cost structure. In addition, since such insurance has an unknown claim event and flexible premiums that may continue indefinitely, the present invention may involve the use of roll-over terms in which the ROP benefit is applied. At the end of each term, the full ROP benefit is available, and a new ROP benefit term begins. Lesser amounts may be paid as a percentage of premium returned if the policy is cancelled in less than the agreed term, beginning at a certain minimum period short of the agreed full term.

The ROP benefit for this class of insurance offers several benefits to both the insured and insurer. The ROP benefit allows the insured an opportunity to recover the amount of premiums paid for required forms of insurance, where previously an insured could not recover any amount of the premiums paid other than through a claim. Further, the ROP benefit is advantageous to the insurer since it encourages insureds to remain with the insurer even where a competitor might offer a less expensive premium for comparable coverage. Also, the ROP benefit works to the insurer's advantage because it encourages the insured to cooperate in reducing the amount of claims, thereby lowering the cost of insurance overall and thus making the insured's policies more competitive using cost-based pricing. Finally, the insured's ROP benefit at the end of the term is believed to be tax free under federal and state law. Thus the ROP benefit compares favorably to an alternative, relatively secure financial investment since the insured's return is measured in after-tax dollars.

It is therefore an object of the present invention to provide for an ROP benefit in an insurance method for property, casualty, and other types of required insurance.

It is a further object of the present invention to provide for an ROP benefit in an insurance method with a cost that varies in proportion with the underlying insurance premium.

It is also an object of the present invention to provide for an ROP benefit in an insurance method that will discourage insureds from switching between policies in response to relatively small premium differences.

It is also an object of the present invention to provide for an ROP benefit in an insurance method where a fraction of the premium may be returned after a minimum period of the ROP term, but before the full term has been completed.

These and other features, objects and advantages of the present invention will become better understood from a consideration of the following detailed description of the preferred embodiments and appended claims in conjunction with the drawings as described following:

BRIEF DESCRIPTION OF THE SEVERAL VIEWS OF THE DRAWINGS

FIG. 1 is a table illustrating possible return of premium (ROP) benefits after various periods of time have elapsed according to a preferred embodiment of the present invention.

DETAILED DESCRIPTION OF THE PREFERRED EMBODIMENTS

Figure 2:
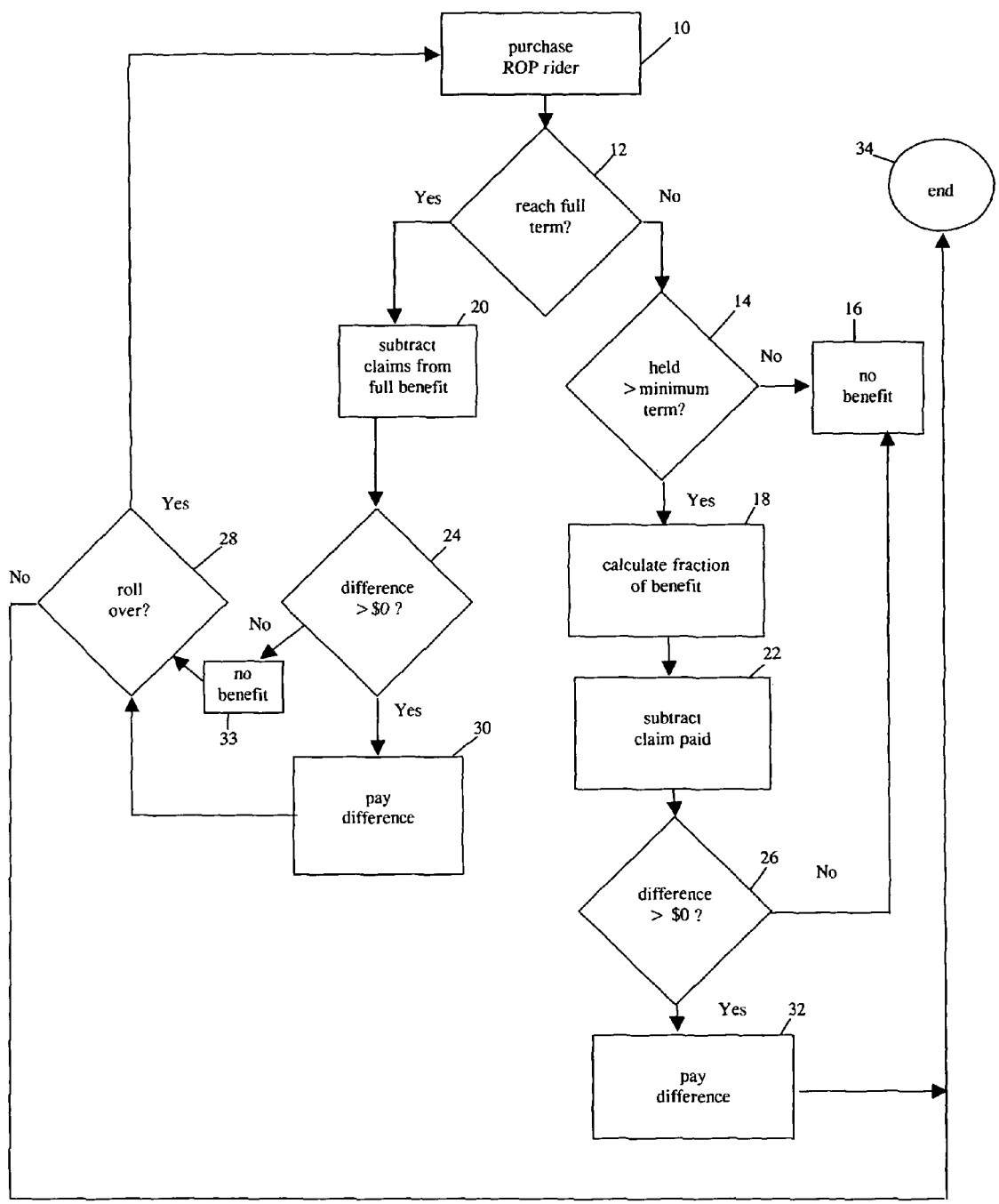
FIG. 2 is a flow chart illustrating the steps in a preferred embodiment of the present invention.

The return of premium (ROP) insurance method is applied according to the preferred embodiment with respect to property and casualty insurance, and related forms of insurance, including insurance that governments or lenders typically require persons to maintain under certain circumstances, and such insurance for which the term is potentially indefinite and the terms of the policy may change over time. In the preferred embodiment, the customer is offered the ROP benefit as a rider to a standard insurance policy. The customer would pay a premium that reflects the cost of the insurance itself plus the value of the ROP benefit. The customer would thus pay a single premium, even though the ROP benefit is offered by the insurer as an add-on option. In alternative embodiments, a policy could be presented that integrates the ROP benefit. In other alternative embodiments, the ROP benefit could be billed to the insured separately from the cost of the standard insurance policy, although it is believed this option would be less attractive to the insured. The cost of the ROP benefit and some variations in policy coverage may be calculated according to actuarial methods, based on the criteria discussed herein.

In the preferred embodiment, the ROP benefit is paid out after the insured has maintained the policy for a defined period. (This period will sometimes be referred to herein as the "full term" of the policy, even though the underlying policies typically have indefinite terms.) The cost of the ROP benefit preferably reflects the length of this defined period or term, with the cost of the ROP benefit being lower for longer terms. This relationship of cost to period reflects both the reduced cost for the ROP benefit to the insurer when the rider is maintained over a longer period of time, as a result of the time value of money, as well as the greater overhead reduction from holding the insured in a policy for a longer term, and thereby further reducing turnover among policyholders.

Also in the preferred embodiment, the insured may choose to terminate the policy after a certain minimum period or term for a return of a fraction of the full ROP benefit. Typically, the policy would provide a certain period of time before which no ROP benefit would be paid if the policy is terminated. This is to ensure a certain minimum level of loyalty to the insurer in order for any ROP benefit to be received. After this minimum period of time, the insured would be entitled to a fraction of the ROP benefit, up until the full term at which the complete premium payment is returned. The fractional ROP benefit would increase as the period that the insured actually held his or her policy increased beyond this minimum term. Preferably, this increase would be exponential or approximately exponential in form, so as to provide further incentive to maintain the policy as the insured more closely approaches the end of the full ROP benefit term.

Referring now to the table of FIG. 1, a representative sample of fractional ROP benefits is provided according to a preferred embodiment of the present invention. The left-most column of FIG. 1 represents the number of years that have passed since the policy was instituted. The second, third, and fourth columns represent ROP benefit fractions for a 15-year, 20-year, and 30-year term of full ROP benefit, respectively. For example, it may be seen that for a policy including an ROP rider that pays the full ROP benefit (that is, a complete return of the premiums paid) after the twentieth year in which the policy is in force, there is no return if the policy is terminated within the first 5 years, and a return of 3% of all premiums paid to date if the policy is terminated after the sixth year in which it is in force. It may be seen that the returns increase at a roughly exponential rate as the full ROP benefit date is approached, further encouraging the insured to maintain the insurance in place and thereby provide stability, and lower processing costs, for the insurer.

It may be seen that the examples provided in the table of FIG. 1 relate to the situation of a fixed premium over a specific number of years. In this scenario, the insurer collects the same amount of money each year in the form of premiums. Since the insurer knows before the ROP rider is implemented how much money will be collected over a pre-determined number of years to pay for the insurance and the ROP benefit, an actuary acting on behalf of the insurer may calculate the appropriate cost of an ROP rider in order to provide the expected ROP benefit and to ensure an appropriate profit for the insurer. This calculation must include a consideration of the fact that a certain percentage of insureds will not reach the minimum period during which any fractional ROP benefit will be paid, and another percentage of insureds will not maintain their insurance policy and ROP rider long enough to receive the full ROP benefit. The calculation may, however, use a fixed fractional ROP benefit chart as shown in FIG. 1. In the preferred embodiment of the invention, however, it is considered that the underlying insurance policy may change over time, such that the premium paid for the insurance may be variable during the life of the ROP rider. Whenever such a change occurs, actuarial calculations must be performed in order to determine an appropriate change in the ROP rider premium, to insure that the payments received by the insurer remain sufficient to cover the full ROP benefit payment at the conclusion of the ROP term, if necessary, and ensure an appropriate profit for the insurer on the ROP rider. Likewise, an adjustment may be required in the fractional benefits payout table, as shown by example in FIG. 1, in order to ensure that the insurer is protected from a loss event. This re-calculation may be performed multiple times during the life of the ROP benefit if the premium paid the insurer on the underlying policy continues to change.

With reference now to FIG. 2, the preferred embodiment of a method according to the present invention may now be described. At block 10, the customer purchases a ROP rider to a standard property or casualty insurance policy in response to an offer from an insurance agent. Although the term of the underlying property or casualty insurance is indefinite, the ROP rider includes a set term at which the full ROP benefit, that is, the full return of all premiums paid, will be refunded to the insured. Also associated with the ROP rider is a minimum term for which the policy must be maintained in order to receive any fraction of the ROP benefit, as well as a formula or table (similar to that shown in FIG. 1) by which the fractional ROP benefit may be calculated if the policy is held between the minimum term and the full term. The insured then holds the policy and ROP rider for a period of time, paying periodic premiums that reflect the combined cost of the insurance itself and the ROP rider. It may be noted that the premiums for such insurance may change over time, and the cost of the ROP will change correspondingly such that the full premium amounts paid at the end of the term may be repaid with an equal return to the insurer on the ROP rider. The cost of the ROP rider may be calculated actuarially, and changes in the ROP rider cost will move in accordance with changes in the underlying policy premium. For example, if the premium increases on a particular policy, then the cost of the ROP rider must increase as well, since additional funds will be necessary to ensure return of all premiums paid at the end of the full term. The length of time from the premium increase to the end of the full term is also a factor in the actuarial calculations to be performed in setting the new ROP rider cost. Such calculations may be performed by an actuary using a personal computer or the like loaded with appropriate software as is known in the art.

The ROP benefit must be calculated whenever either the insured cancels the policy or the full ROP benefit term is reached. At decision block 12, the method inquires whether the policy has in fact been held for the full term. As illustrated in FIG. 1, a full term might be, by way of example, fifteen, twenty, or thirty years. Any period of time that is a multiple of the premium payment period may alternatively be employed as a full term, with the cost of the ROP benefit being inversely proportional to the length of such period. If at decision block 12 the answer is "yes," then processing moves to block 20. This represents the condition of a full ROP benefit being returned to the insured.

At processing block 20, the amount of any claims that have been made during the policy term are subtracted from the full amount of all premiums paid during the term. At decision block 24, it is inquired whether the resulting difference from block 20 is greater than zero. If the answer to this question is "no," then the insured receives no ROP benefit at block 33 and processing continues to decision block 28 (described below). The insured has, in effect, already received his or her return of premium by means of the insurer's payment of claims made during the policy term. The amount by which the insured's claims exceed the full ROP benefit, if any, is irrelevant for this calculation, so long as the claims do in fact meet or exceed the full ROP benefit as determined at decision block 24. If the answer to this question is "yes," then processing moves to block 30, where the insurer pays to the insured the difference calculated at block 20. Processing then moves to decision block 28.

At decision block 28, the method inquires whether the insured wishes to "roll over" the ROP benefit, that is, continue paying an additional premium amount such that full premiums will be returned after a subsequent ROP benefit term is elapsed. The full term of this subsequent ROP benefit need not be the same as the full term of the recently lapsed ROP benefit. In an alternative embodiment, the insurer can automatically "roll over" the ROP benefit unless the customer requests a change in policy conditions. In either case, if the customer answers "no" at decision block 28, then processing ends at terminal block 34. If the customer answers "yes" at decision block 28, then processing returns to block 10 where the additional ROP rider is purchased and held for all or some portion of the subsequent term.

If the answer at decision block 12 is "no," that is, if the customer has not reached the full ROP benefit term and the policy is thus being terminated early, then processing continues to decision block 14. At decision block 14, it is inquired whether the insured has held the policy for the minimum term in order to receive a fractional ROP benefit. In the preferred embodiment as illustrated by the table of FIG. 1, the insured must hold a policy for a minimum of five years before any benefit is received, although this minimum may be any period that is a multiple of the periods at which premiums are paid. If the answer at decision block 14 is "no," that is, if the person has not held the policy long enough even to receive a fractional ROP benefit, then block 16 is received at which the insured receives no return and the policy terminates at terminal block 34. If the answer at decision block 14 is "yes," then the insured has held the policy long enough to receive a fractional ROP benefit, but has not held the policy long enough to receive the full return of all premiums paid. Processing continues then at block 18.

At block 18, the fractional ROP benefit to which the insured may be entitled is calculated. This calculation may be, for example, based on a formula, or based on a table as illustrated in FIG. 1. Typically this step, as well as some or all of the other steps of the method, would be performed by a personal computer or the like as part of an automated policy cancellation processing routine implemented in software developed for this purpose. Using the fractional ROP benefit calculated at block 18, block 22 subtracts from this amount the total amount of any claims made by the insured during the policy term. At decision block 26, it is inquired whether the resulting difference from block 22 is greater than zero. If the answer to this question is "no," then the insured receives no ROP benefit at block 16, the policy is cancelled, and processing ends at termination block 34. If the answer to this question is "yes," then processing moves to block 32, where the insurer pays to the insured the difference calculated at block 22. The policy is then cancelled, and processing ends at termination block 34.

It may be noted that while in the example of FIG. 2 it is assumed that the policyholder purchases the ROP rider at the time that a new policy is instituted, the present invention is not so limited. The policyholder in fact has the option of discontinuing the ROP at any time, instituting a new ROP rider after the cancellation of a previous ROP rider, or starting the ROP rider at any time after the underlying policy has come into force. If the policyholder adds the ROP rider to a policy that is already in existence, then the ROP benefit on the existing policy starts to accrue when the ROP rider comes into effect. If the policyholder cancels the ROP rider at any time for any reason, the policyholder receives a partial refund of premiums if the ROP has been in existence for the requisite period of time.

As an illustrative example of the above circumstances, suppose that a policyholder has an ROP rider with a twenty-year term that has been in force for five years, and then has an insurance claim in the amount of $5,000. Further suppose that the total annual premiums that have been paid are in the amount of $1,000 per year. The policyholder then has the option of continuing the ROP for the next fifteen years, in which case if there are no further claims the insured will receive an ROP benefit of $15,000. The policyholder may also choose, however, to discontinue the ROP rider and be issued a new twenty-year ROP rider. If there are no further claims, then the policyholder will receive $20,000 at the end of the new ROP rider period.

As another illustrative example, suppose that a policyholder paid $1,000 per year in premiums on a policy with a twenty-year ROP rider, then experiences a claim in the amount of $30,000. The policyholder could discontinue the ROP rider at that point, since no benefit can accrue as the claim has now exceeded the potential ROP benefit. The policyholder may, however, start a new ROP rider for the continuing policy. The cash value for this new ROP rider would begin again, with no cash value being realized until, for example, the sixth year following the start of the new ROP rider, assuming a benefit structure as shown in FIG. 1.

The present invention has been described with reference to certain preferred and alternative embodiments that are intended to be exemplary only and not limiting to the full scope of the present invention as set forth in the appended claims.

What is claimed is:

1. A method for offering a multi-term insurance product with a return-of-premium benefit utilizing a computer, comprising the steps of:
   (a) computing with the computer an initial premium amount for an initial policy term for the insurance product, wherein the insurance product comprises one of non-commercial homeowners' insurance and non-commercial automobile insurance, based upon one of an input value of an insured property or a computerized risk assessment for an insured casualty risk;
   (b) computing with the computer a cost for a return-of-premium benefit utilizing a return-of-premium algorithm, wherein said return-of-premium computation receives as input the initial premium amount, a return-of-premium term, and a plurality of return-of-premium fractions, wherein each return-of-premium fraction corresponds to an insured period that is not greater than the return-of-premium term, and wherein the return-of-premium fractions increase exponentially as the corresponding insured period increases;
   (c) computing with the computer a total initial premium amount by adding the initial premium amount to the cost for a return-of-premium benefit;
   (d) outputting from the computer an initial insurance product offering comprising the total initial premium amount for the initial policy term;
   (e) receiving a change in a condition related to the one of an input value of an insured property or a computerized risk assessment for an insured casualty risk;
   (f) computing with the computer a subsequent premium amount for a first subsequent policy term;
   (g) re-computing with the computer the cost for the return-of-premium benefit utilizing the return-of-premium algorithm, wherein said return-of-premium re-computation receives as input the subsequent premium amount, the return-of-premium term, and the plurality of return-of-premium fractions;
   (h) computing with the computer a total subsequent premium amount by adding the subsequent premium amount to the cost for a return-of-premium benefit;
   (i) outputting from the computer a revised insurance product offering comprising the total subsequent premium amount for the first subsequent policy term;
   (j) during or after the first subsequent policy term, receiving a request to cancel the insurance product;
   (k) calculating with the computer the return-of-premium benefit by multiplying the total of all premiums paid during the insured period by the corresponding return of premium fraction, and then subtracting a total amount of all claims paid during the insured period; and
   (l) when the calculated return-of-premium benefit is greater than zero, providing the return-of-premium benefit to the insured.

2. The method of claim 1, further comprising the steps of:
   (a) computing a revised premium amount in response to a policy change occurring during a revised policy term, wherein the revised term comprises at least one of the initial and subsequent policy terms;
   (b) computing the cost for a revised return-of-premium benefit during the revised policy term utilizing the return-of-premium algorithm, wherein said return-of-premium algorithm receives as input the revised premium amount, the return-of-premium term, and the fraction of the return-of-premium term remaining;
- (c) computing a revised total premium amount by adding the revised premium amount to the cost for the revised return-of-premium benefit; and
- (d) revising at least one of the initial and subsequent insurance product offerings to comprise the revised total premium amount.

3. The method of claim 2, further comprising the step of computing and outputting a revised return-of-premium benefit.

4. The method of claim 3, wherein said step of computing and outputting a revised return-of-premium benefit comprises the steps of:
- (a) receiving a request to compute a revised return-of-premium benefit;
- (b) calculating a revised return-of-premium benefit by subtracting a total amount of all claims paid from a total of all premiums paid during the revised term.

5. The method of claim 3, wherein said step of computing and outputting a revised return-of-premium benefit comprises the steps of:
- (a) receiving a request to compute a revised return-of-premium benefit during the revised term; and
- (b) calculating a revised return-of-premium benefit by subtracting a total amount of all claims paid from the product of a total of all premiums paid during the revised term multiplied by the return-of-premium fraction corresponding to the insured period.

6. The method of claim 1, further comprising the step of receiving a request for a return-of-premium benefit after the initial term, and wherein the return-of-premium benefit is added to a subsequent premium amount rather than to the initial premium amount to calculate with the computer a total subsequent premium amount.

7. The method of claim 1, further comprising the step of receiving a request for a second return-of-premium benefit after the initial term and after the expiration of the return-of-premium benefit term.

8. The method of claim 7, further comprising the step of computing with the computer a cost for the second return-of-premium benefit utilizing the return-of-premium algorithm, wherein the return-of-premium computation receives as input a subsequent premium amount, a second return-of-premium term, and a second plurality of return-of-premium fractions, wherein each of the second plurality of return-of-premium fractions corresponds to a multi-term insured period that is less than the second return-of-premium term, and wherein the second plurality of return-of-premium fractions each increase exponentially as the corresponding multi-term insured period increases.

9. The method of claim 1, wherein the return-of-premium fraction for a policy term of 1 to 5 years is 0%.

10. The method of claim 9, wherein the return-of-premium term is 15 years.

11. The method of claim 9, wherein the return-of-premium term is 20 years.

12. The method of claim 9, wherein the return-of-premium term is 30 years.

* * * * *